United States Patent
Reddig et al.

(10) Patent No.: US 11,757,267 B1
(45) Date of Patent: Sep. 12, 2023

(54) CABLE MANAGEMENT SYSTEM AND MODESTY PANEL FOR HEIGHT ADJUSTABLE DESK

(71) Applicant: Haworth, Inc., Holland, MI (US)

(72) Inventors: Ralph E. Reddig, Holland, MI (US); Kirk Hines, Allegan, MI (US); Kristopher A. Gillhespy, Grand Rapids, MI (US); EuGene A. Crevier, Jr., Zeeland, MI (US); Shane R. Kuipers, Hamilton, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 17/826,343

(22) Filed: May 27, 2022

(51) Int. Cl.
*H02G 3/04* (2006.01)
*A47B 9/20* (2006.01)

(52) U.S. Cl.
CPC .............. *H02G 3/0406* (2013.01); *A47B 9/20* (2013.01); *H02G 3/0468* (2013.01); *A47B 2200/0059* (2013.01); *A47B 2200/0081* (2013.01); *A47B 2200/0082* (2013.01); *A47B 2200/12* (2013.01)

(58) Field of Classification Search
CPC ....... A47B 83/001; A47B 83/04; A47B 41/02; A47B 21/00; A47B 9/00; A47B 13/003; A47B 13/08; A47B 37/00; A47B 3/087; A47B 2200/0035; A47B 2200/0066; A47B 2200/0054; A47B 2200/0082; A47B 21/02; A47B 2200/008; A47B 2200/0081; A47B 2097/003; A47B 2021/066; A47B 21/06
See application file for complete search history.

(56) References Cited

U.S. PATENT DOCUMENTS

| | | | | | |
|---|---|---|---|---|---|
| 2,299,140 | A | * | 10/1942 | Hanson | H01B 7/0045 174/72 A |
| 3,908,565 | A | * | 9/1975 | Burnett | A47B 23/046 108/150 |
| 4,646,211 | A | * | 2/1987 | Gallant | H01R 25/16 439/445 |
| 4,667,605 | A | * | 5/1987 | Bastian | A47B 9/20 108/106 |
| 4,685,255 | A | * | 8/1987 | Kelley | E04B 2/7405 52/36.6 |

(Continued)

*Primary Examiner* — Krystal Robinson
(74) *Attorney, Agent, or Firm* — Warner Norcross + Judd LLP

(57) ABSTRACT

A modesty panel includes a back cover adjacent the underside of the worksurface, a power strip or power bar having at least one electrical outlet, a cord system electrically connected to the power bar and an electrical power supply, the cord system including at least one cable. A cable management track is positioned adjacent the back cover. The track has a track sidewall that defines a cable entrance portion including a cable entrance opening, a cable storage portion extending from the cable entrance portion and including a cable exit opening, and a cable guide. The cord system extends through the entrance opening and the exit opening in the track, such that a length of the cord system is positioned within the cable management track, and wherein as the height adjustable table is moved to a lower position, the length of cord system within the track increases, with a portion of the cord system engaging the cable guide to route the cord system into the cable storage portion of the cable management track.

22 Claims, 9 Drawing Sheets

(56) References Cited

U.S. PATENT DOCUMENTS

| | | | | |
|---|---|---|---|---|
| 4,762,072 | A * | 8/1988 | Boundy | A47B 21/06 |
| | | | | 108/50.02 |
| 4,852,500 | A * | 8/1989 | Ryburg | A47B 21/06 |
| | | | | 108/50.01 |
| 5,322,025 | A * | 6/1994 | Sherman | A47B 9/10 |
| | | | | 108/147 |
| 5,394,809 | A * | 3/1995 | Feldpausch | A47B 9/14 |
| | | | | 108/147.21 |
| 5,988,076 | A * | 11/1999 | Vander Park | A47B 21/06 |
| | | | | 108/50.02 |
| 6,327,983 | B1 * | 12/2001 | Cronk | A47B 21/06 |
| | | | | 108/50.02 |
| 6,360,675 | B1 * | 3/2002 | Jones | A47B 9/00 |
| | | | | 108/50.02 |
| 7,066,097 | B2 * | 6/2006 | Gayhart | A47B 21/06 |
| | | | | 108/50.02 |
| 11,266,232 | B2 * | 3/2022 | Knapp | F16M 11/28 |
| 2013/0126233 | A1 * | 5/2013 | Nagayasu | B60R 16/0215 |
| | | | | 174/72 A |
| 2018/0000240 | A1 * | 1/2018 | Yamamoto | A47B 9/20 |

* cited by examiner

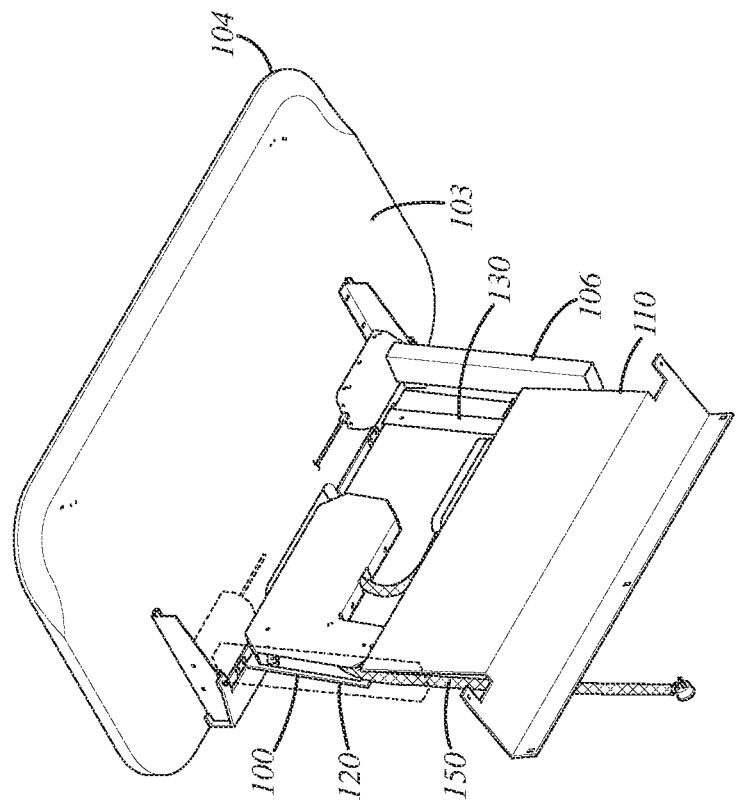
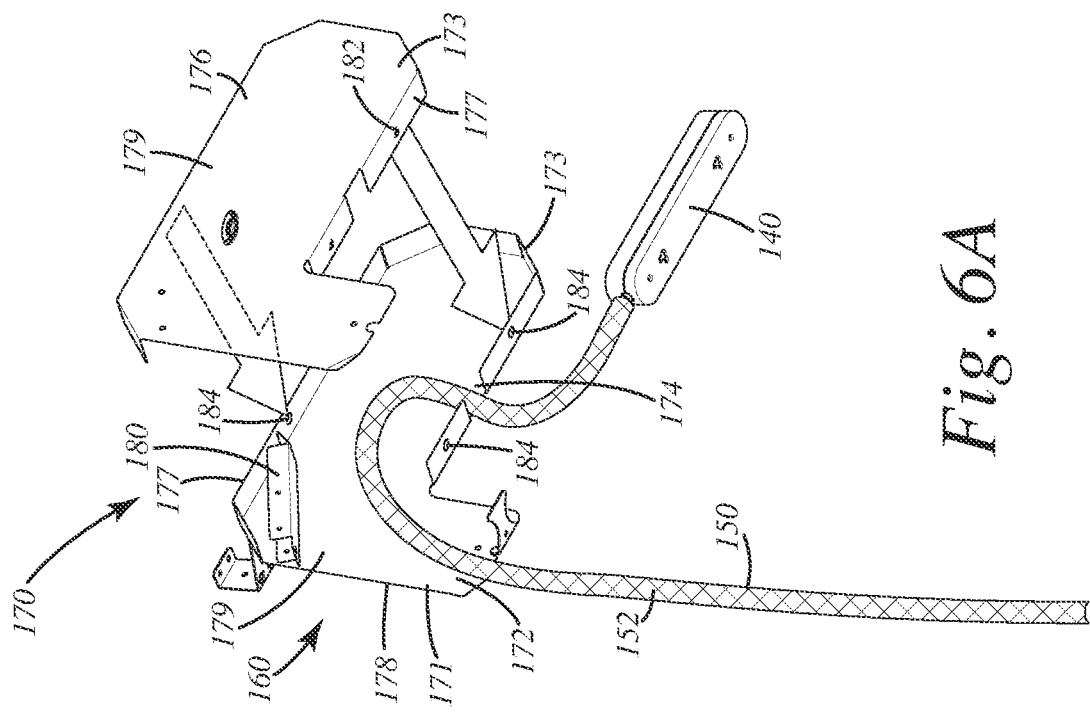
Fig. 6A
Fig. 6B

CABLE MANAGEMENT SYSTEM AND MODESTY PANEL FOR HEIGHT ADJUSTABLE DESK

BACKGROUND OF THE INVENTION

The present invention relates to a modesty panel for a height adjustable desk and a cable management system located therein.

Height adjustable desks or height adjustable tables ("HATs") allow for a user to adjust the height of their worksurface to fit their needs. HATs have a user-customizable height rather than only being adjustable at installation. For example, a user may raise the HAT to work from a standing position and lower the HAT to work from a seated position.

A user often uses many items on their worksurface that require power and otherwise utilize cords. Cords have traditionally encumbered the movement of a HAT because they are not designed to move with the worksurface. HATs that incorporate the power and other connections have a similar issue because the power source (e.g. a wall outlet) does not move with the worksurface. Traditional methods of powering HATs have issues with cable management including cords getting tangled, caught in the moving mechanism, bent, or otherwise damaged. Therefore, there is a need for an aesthetically pleasing system that obscures the cords and also allows the cords to move with the worksurface while preventing damage to the cords.

SUMMARY OF THE INVENTION

The present invention provides a cable management modesty panel for a height adjustable table. In one embodiment, modesty panel includes a back cover adjacent the underside of the worksurface, a power strip or power bar having at least one electrical outlet, a cord system electrically connected to the power bar and an electrical power supply, the cord system including at least one cable, and a cable management track positioned adjacent the back cover. The track has a track sidewall that defines a cable entrance portion including a cable entrance opening, a cable storage portion extending from the cable entrance portion and including a cable exit opening, and a cable guide. The cord system extends through the entrance opening and the exit opening in the track, such that a length of the cord system is positioned within the cable management track, and wherein as the height adjustable table is moved to a lower position, the length of cord system within the track increases, with a portion of the cord system engaging the cable guide to route the cord system into the cable storage portion of the cable management track.

In one embodiment, the cable guide is a portion of the track sidewall positioned opposite the entrance opening and is set at an angle with respect to the entrance opening to direct the cord system into the cable storage portion of the track. The cable guide may be an angled bracket that is coupled to the track.

In one embodiment, the modesty panel includes a front cover spaced from the back cover, and the track includes a front face adjacent the front cover and a back face adjacent the back cover, the track sidewall extending between the front face and the back face. One of the front face and the rear face of the track may be removably connectable to the other of the front face and the rear face. For example, the track sidewall may include a front track wall and a back track wall, the front track wall integral with and extending from the front face and the rear track wall integral with and extending from the rear face, wherein one of the front track wall and the rear track wall includes a coupling protrusion and the other includes a detent aligned with the coupling protrusion such that the front and rear faces can couple via a snap fit between the coupling protrusion and the detent. The front track wall and the rear track wall may be mirror images.

In one embodiment, the track sidewall within the cable entrance portion includes a pair of generally parallel sidewalls extending in a first direction, and the track sidewall within the cable storage portion includes a pair of generally parallel sidewalls extending in a second direction different from the first direction such that the cable storage portion extends at an angle from the cable entrance portion.

The modesty panel may include a mounting bracket affixed to the underside of the worksurface and at least one of the back cover and the front cover. The mounting bracket may support the cable housing track in a non-handed manner, such that either the front face or the rear face can be mounted on the mounting bracket.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or may be carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 6A is an exploded view of a cable management system according to one aspect.

FIG. 6B is a lower perspective view of a modesty panel with the front cover exploded from the modesty panel according to one aspect.

DETAILED DESCRIPTION OF THE CURRENT EMBODIMENT

Figure 1:
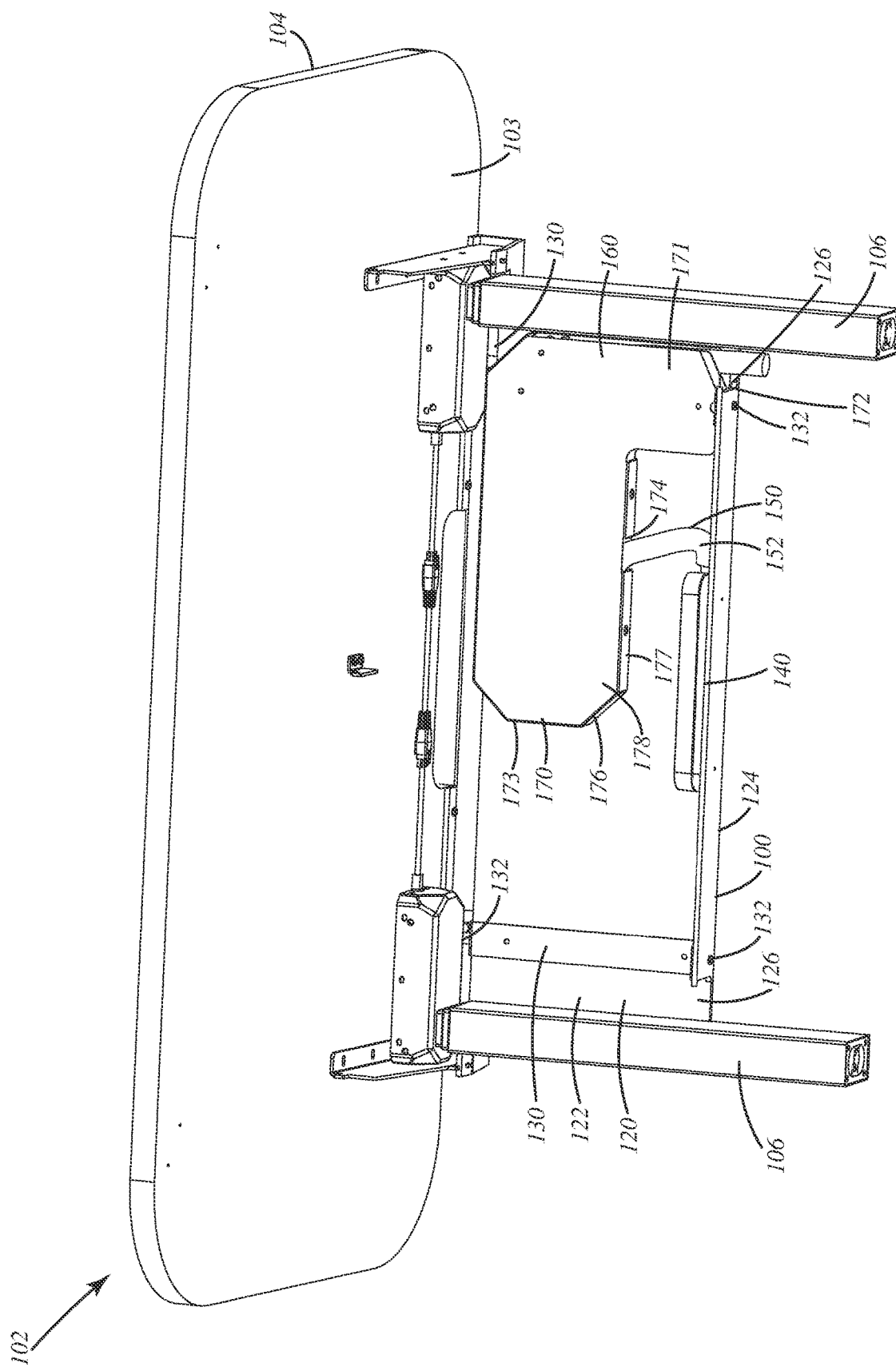
FIG. 1 is a modesty panel without a front cover according to one aspect.
Figure 4:
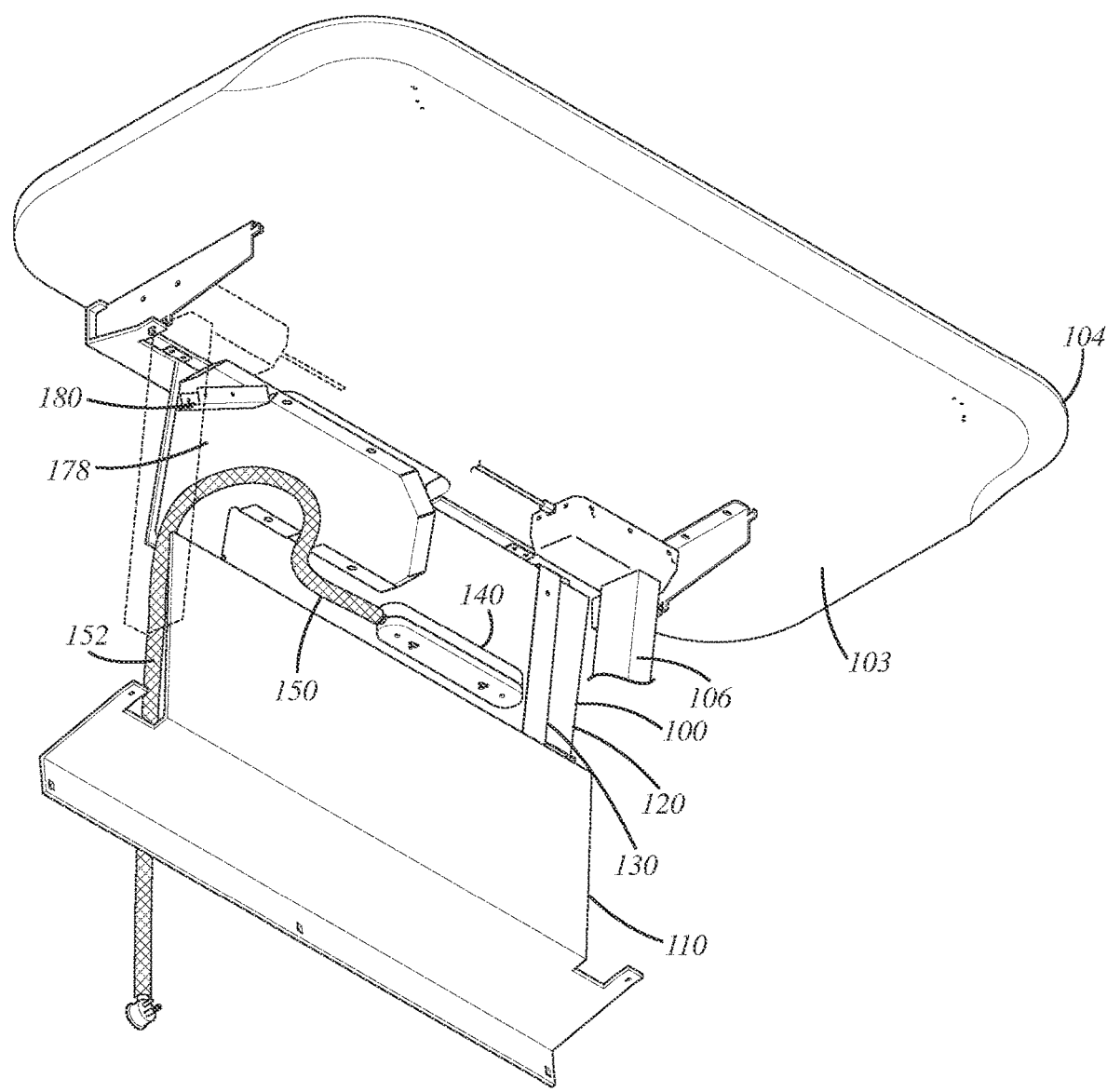
FIG. 4 is a perspective view of a modesty panel with the front cover and power bar exploded from the modesty panel according to one aspect.
Figure 5:
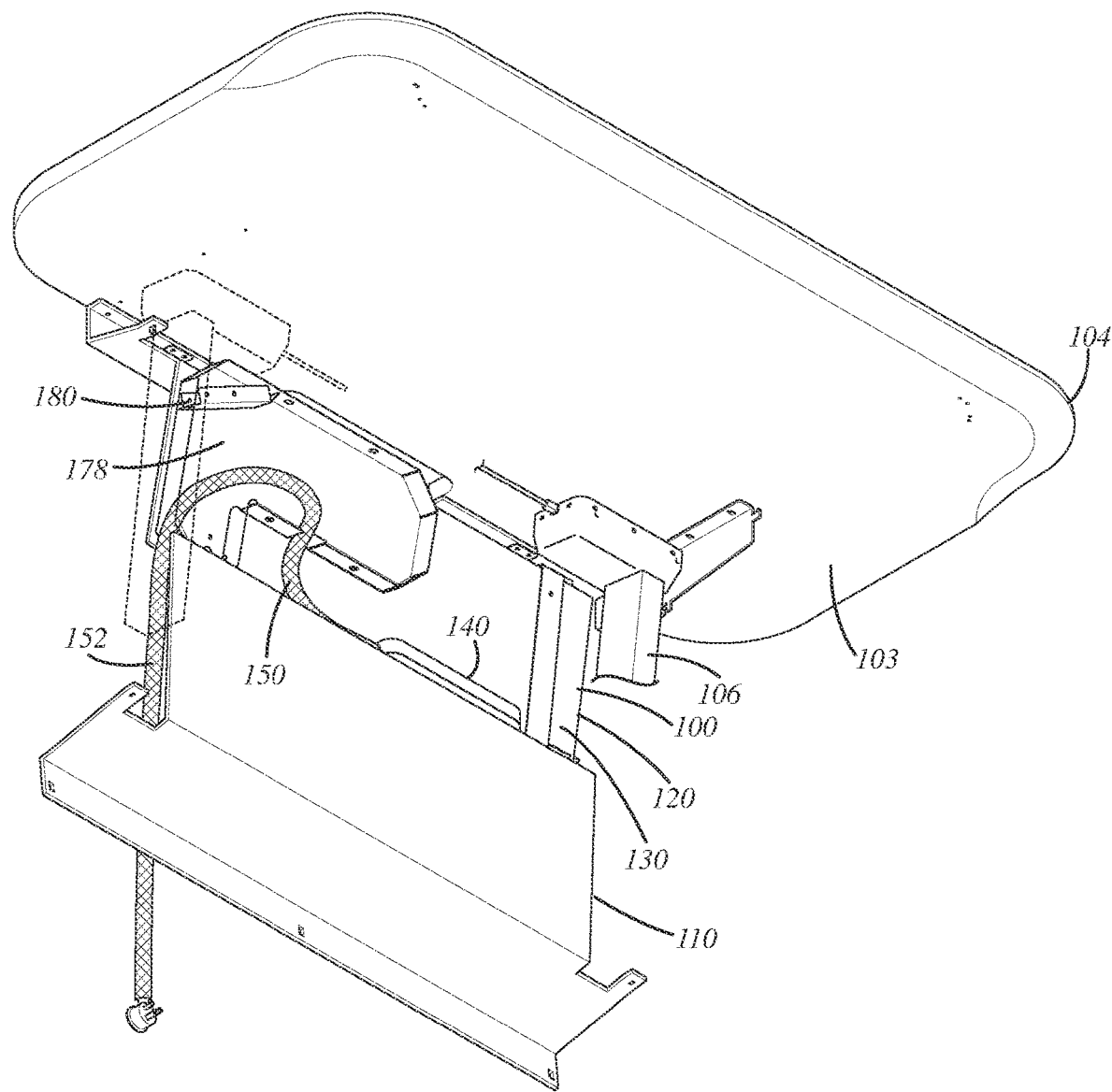
FIG. 5 is a perspective view of a modesty panel with the front cover exploded from the modesty panel according to one aspect.

A modesty panel for a height adjustable table ("HAT") provides an opportunity to obscure a cable management system from view. A portion of the modesty panel 100 according to one aspect is shown in FIG. 1. In one embodiment, the modesty panel includes front 110 (depicted exploded from the modesty panel in FIG. 4) and back 120 covers that form the privacy portion of the panel 100. The covers 110, 120 conceal a power strip or power bar 140, a portion of a cord system 150 connected between the power bar 140 and a conventional wall outlet, and a cable management housing 160 that can take up a portion of the cord system 150 as the HAT 102 is lowered.

The modesty panel 100 may attach to a variety of types and styles of HAT 102. One such HAT is shown in FIGS. 1-8. HAT's are known in the art and therefore will not be described in detail. Suffice it to say that HAT's generally include a worksurface 104 having an underside 103. The worksurface 104 is supported by a pair of legs 106, which are connected to a motorized or manual drive unit that can be actuated to telescope or otherwise extend and retract the legs 106 to therefore raise and lower the worksurface 104 between a raised position that may be used as a standup desk, and a lowered position that may be used for a seated user.

As noted, the modesty panel 100 can include a front cover 110 and a back or rear cover 120 that form the privacy portion of the modesty panel 100. The front cover 110 and the back cover 120 may be collectively referred to as the modesty panel housing. The front 110 and back 120 covers extend downwardly from the HAT, and in one embodiment they extend downwardly from a bottom surface 103 of the worksurface 104. In the embodiment shown in FIG. 8, the combined front and rear covers 110, 120 horizontally span a portion of the bottom surface 103, and then turn to extend vertically downward to form the privacy portion of the modesty panel. In another embodiment, the front and rear covers 110, 120 may simply extend vertically downward from the bottom surface 103 of the worksurface 104. And in another aspect, the front and rear covers 110, 120 are spaced from each other and can have any suitable shape for a given HAT 102 and for the components that are being concealed. In one aspect, the modesty panel 100 may be used with a pre-existing HAT 102 in a retrofit manner. In another aspect, the modesty panel 100 can be designed in connection with a new HAT 102. In a still further embodiment, the modesty panel 100 can be provided with only a back cover 120 (as shown in FIG. 1), such that the cable management system 160 is exposed from one side. The front 110 or back 120 covers may be removably connected to the worksurface 104 to enable a user to move or remove them to access the electrical components without any external tools. For example, one or both of the front 110 and back 120 covers may include a latch that enables a user to disconnect the cover from the underside 103 of the worksurface 104 to remove or fold down the cover for access to the underlying components.

Figure 2:
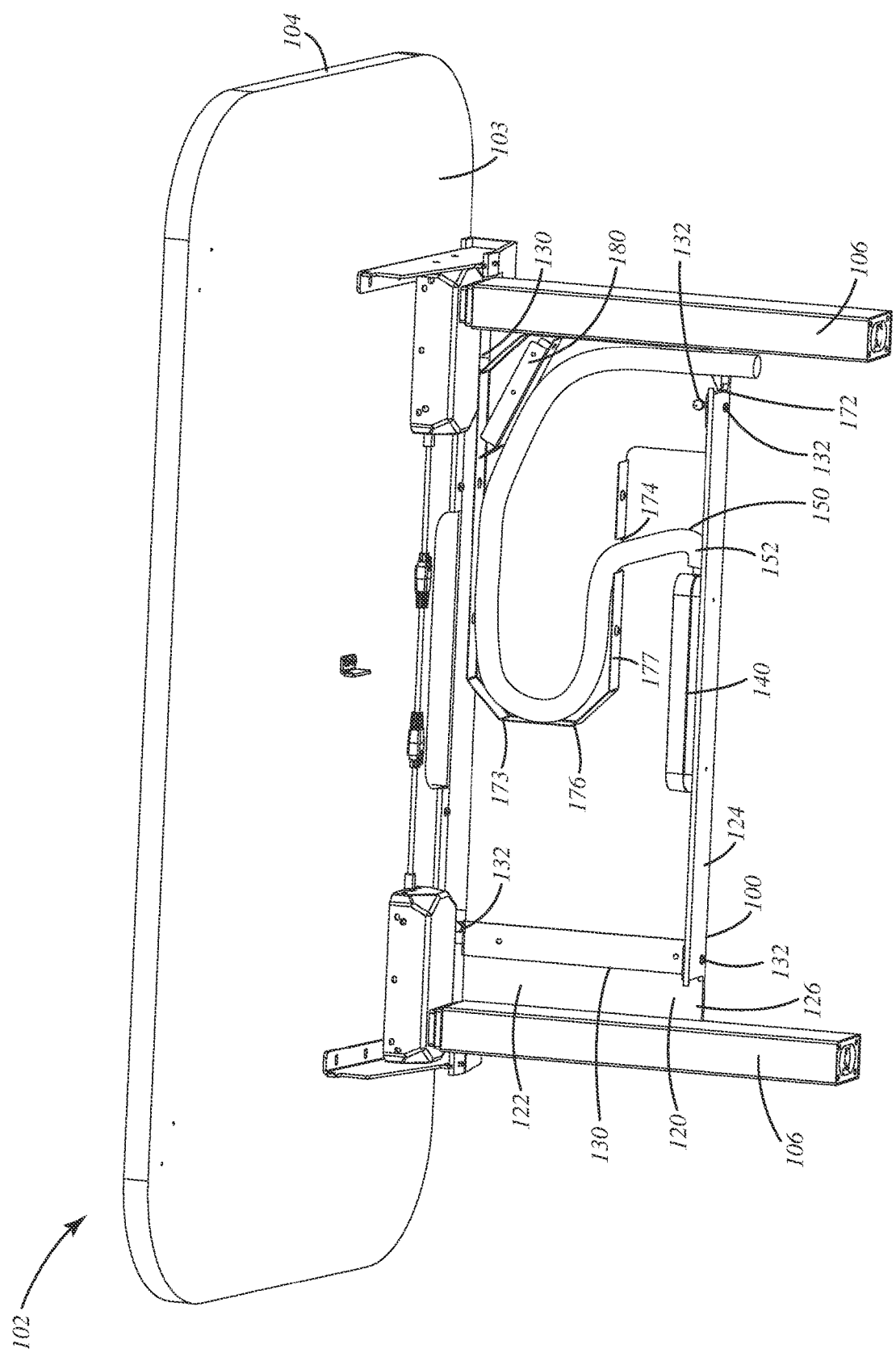
FIG. 2 is a modesty panel without a front cover and without a second track housing member according to one aspect.

The front cover 110 may be connected to the back cover 120. In one embodiment, the front cover 110 is configured to removably couple to the back cover 120. In an alternate aspect, the front cover 110 may be fixedly coupled to the back cover 120. The back cover 120 can be seen in greater detail in FIGS. 1-2. As depicted in FIGS. 1-2, the back cover 120 includes a back surface 122 and a coupling flange 124 extending from the back surface 122 along a portion of the lower perimeter of the back surface 122. The coupling flange 124 may define at least one notch or cord system opening 126. As depicted, the coupling flange 124 defines two cord system openings 126; one cord system opening 126 adjacent a left mounting bracket 130 and one cord system opening adjacent a right mounting bracket 130. In one aspect, the back cover 120 can be open at the bottom thereby defining one long cord system opening 126. In one aspect, the back cover 120 may define the at least one cord system opening 126 by any other suitable means. In one aspect, the front cover 110 may define the at least one cord system opening 126. In another aspect, the coupling of the front cover 110 and the back cover 120 may define the at least one cord system opening.

Figure 8:
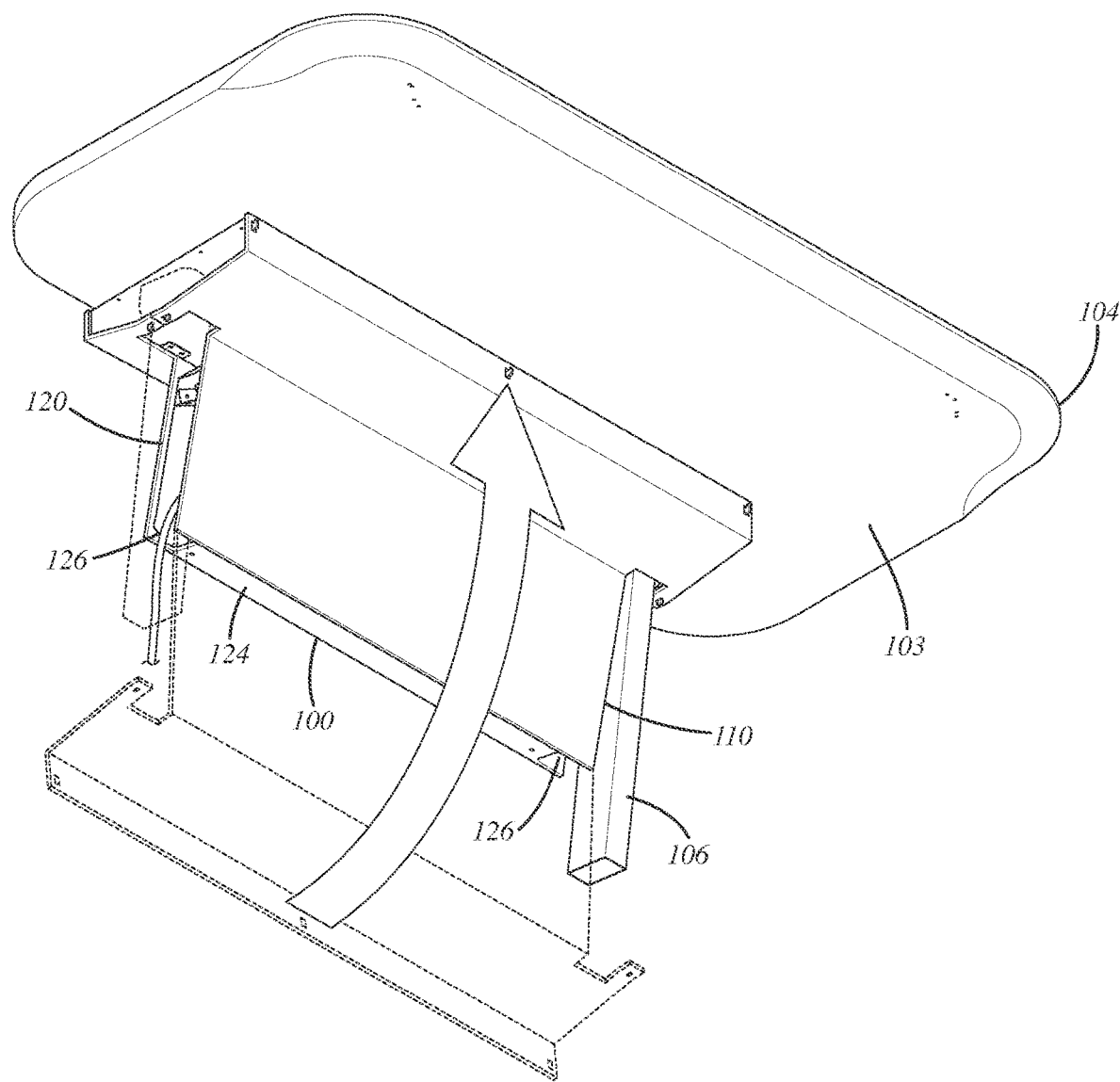
FIG. 8 is a perspective view of a modesty panel showing an installation of the front cover according to one aspect.

As noted, in one embodiment, the front cover 110 can removably couple to the back cover 120 through the coupling flange 124. In one aspect, the front cover 110 may not be connected to the back cover 120. For example, as depicted in FIG. 8, the front cover 110 may be connected to the HAT 102 and positioned such that it is generally parallel to, and spaced from, the rear cover 120 at about the distance of the coupling flange 124. In another aspect, the front cover 110 may be fastened to the back cover 120 using any suitable fastener. In one aspect, the front cover 110 may be friction fit to the back cover 120. In one embodiment, the front cover 110 and back cover 120 can be made from a single piece of fabric that loops underneath the cable management system 160 and components. The back cover 120 can have any suitable shape for a given HAT 102. In FIG. 8, the front cover 110 is shown in broken lines in a first position wherein the front cover 110 is hinged or folded downwardly to provide access to the cable management system 160, and shown in solid lines in a use position in which the front cover 110 is rotated about 180 degrees from the first position to a second position in which it covers the cable management system and is connected to the worksurface 104 or another portion of the modesty panel 100. As noted above, the user may be able to disconnect and pivot the front cover 110 without the need for external tools.

At least one mounting bracket 130 can removably couple one of the back cover 120 or front cover 110 to the HAT 102. As depicted in FIGS. 1-2 and 4-5, the modesty panel 100 includes two identical mounting brackets 130. The mounting brackets 130 may removably couple the back cover 120 to the HAT 102 by any suitable means. As depicted, the mounting brackets 130 are secured to the back cover 120 and the HAT 102 through a plurality of fasteners 132. In one aspect, the fasteners 132 are screws.

Figure 3A:
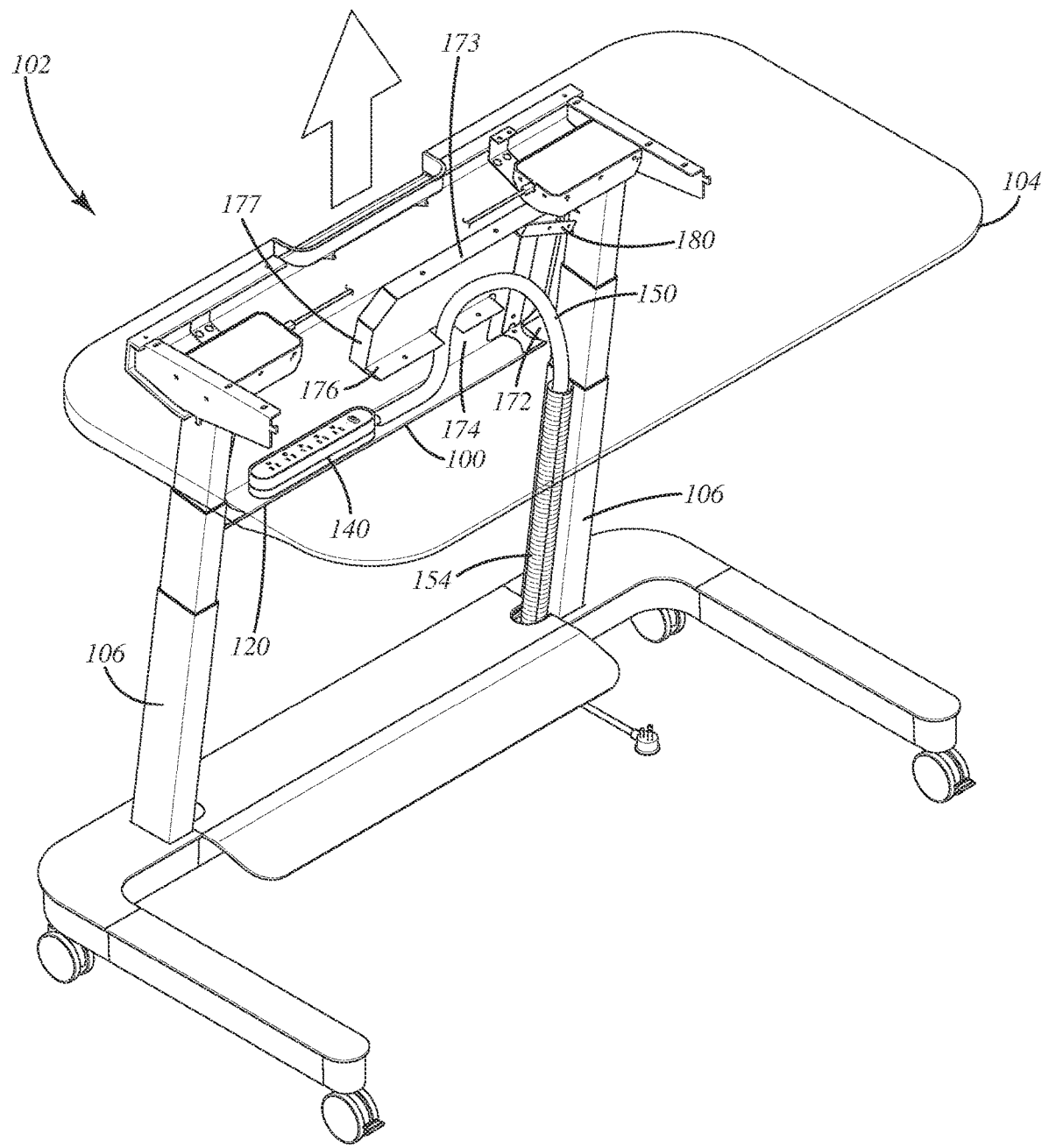
FIG. 3A is a modesty panel shown through a transparent worksurface and without a front cover showing the positioning of the cord system with the worksurface in a raised position according to one aspect.

The modesty panel 100 can include a power strip or power bar 140. The power bar 140 may be connected to electronics on the HAT 102 to power the electronics. For example, the power bar 140 may include electrical outlets for powering one or more electrical accessories on the worksurface 103. In one aspect, the power bar 140 may provide both power and data communications. For example, the power bar 140 can provide data communications through an ethernet cable outlet. As depicted, the power bar 140 is mounted on the coupling flange 124 of the cover 120. In one aspect, the power bar 140 may rest on the coupling flange 124. In another aspect, the power bar 140 can be secured to the coupling flange 124 through any suitable means. In an alternate aspect, the power bar 140 can be coupled to another portion of the back cover 120 or front cover 110, and in an embodiment where the front 110 and rear 120 covers are a single piece of fabric, the power bar 140 can rest in the loop of the fabric. The power bar 140 may be mounted such that it is fixed in position with respect to the exit opening 174, and in one embodiment as shown in FIG. 3A, the power bar 140 and cord system 150 are positioned such that a portion of the cord system 150 extends vertically into the exit opening 174. In one embodiment, a portion of the cord system 150 near the power bar 140 is fixed to the cover 120 to control the direction of the cord system 150 as it enters the exit opening 174. In another embodiment, the cord system 150 may be fixed to a portion of the leg 106 (such as with a zip tie), such that only a predetermined section of the cord system 150 between the power bar 140 and the fixed point on the leg 106 can enter and exit the cord management system 160 as the worksurface 104 is raised and lowered.

A cord system 150 may be electrically connected to the power bar 140 and a power supply (not shown), such as a standard wall outlet or a hard-wired power supply. In an aspect in which the power bar 140 provides data communications, the cord system 150 may also allow for data communications. The cord system 150 can include at least one cable (not pictured), such as a power or communications cable, and a sheath 152 surrounding the at least one cable, such as a conventional mesh sheath that can be wrapped around one or more cables. The sheath 152 can provide rigidity to the cord system 150, which may help prevent damage to the cord system 150. The sheath 152 may also help the cord system 150 to move as directed by the cable management system 160 and thereby help it to not encumber the movement of the HAT 102.

The modesty panel 100 further includes a cable management system 160 configured to direct the movement of the cord system 150. The cable management system 160 may be positioned between the front 110 and rear 120 covers, and may include a track housing 170 forming a track for guiding and storing the cord system 150 as the HAT is raised and lowered. The track housing 170 can define an entrance opening 172 and an exit opening 174. The entrance opening 172 allows the cord system 150 to enter the track housing 170 and the modesty panel 100. The entrance opening 172 may be configured to align with the cord system opening 126 when the track housing 170 is coupled to the back cover 120. The exit opening 174 allows the cord system 150 to exit the track housing 170 into the modesty panel 100 where the cord system 150 is connected to the power bar 140. As depicted, the track housing 170 includes a vertical portion 171 and a rounded horizontal portion 173 extending from a distal end of the vertical portion 171. In one aspect, the track housing 170 has a "P" shape. In another aspect, the track housing 170 may have any suitable shape to direct the cord system 150.

Figures 7A, 7B:
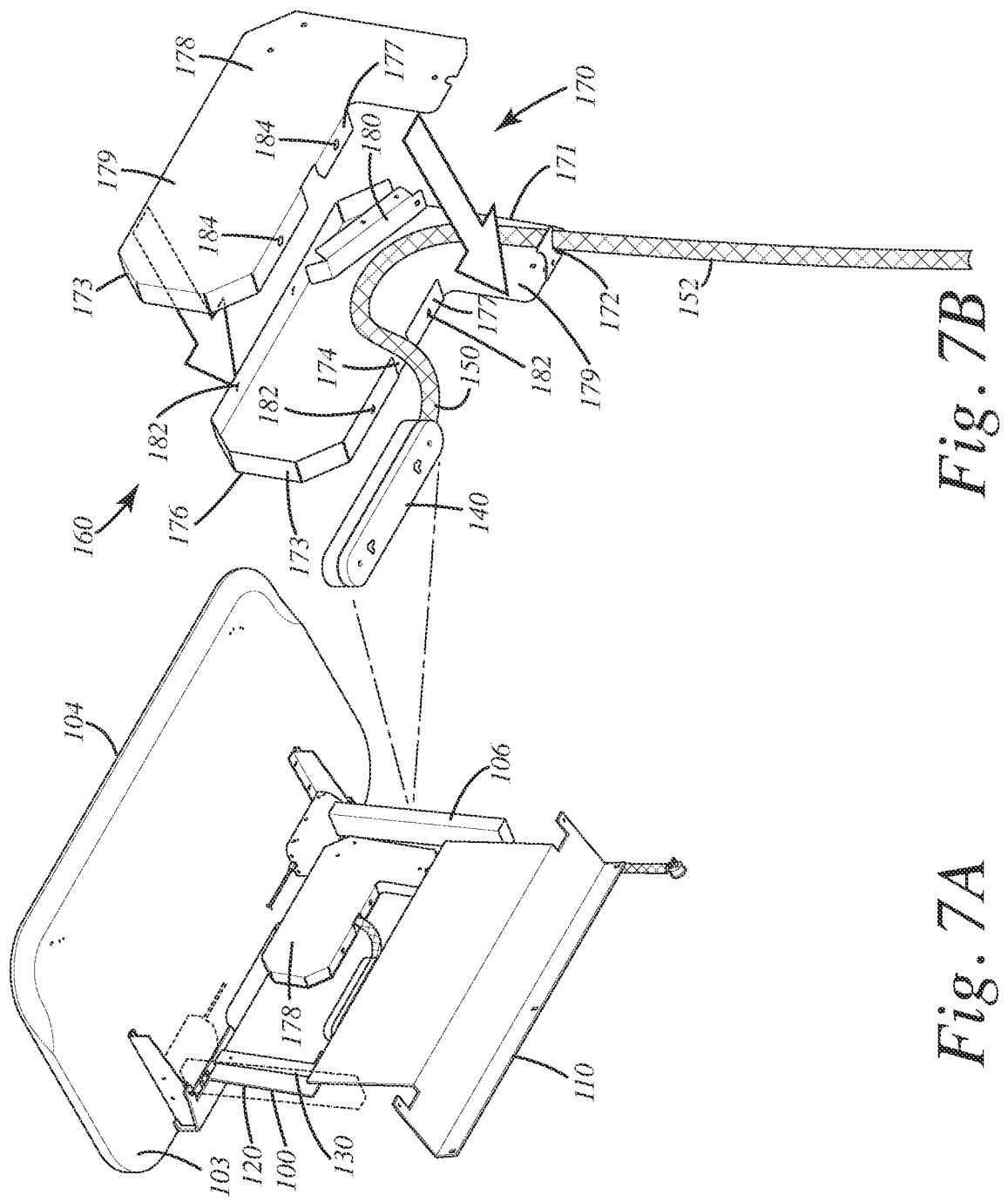
FIG. 7A is a perspective view of a modesty panel with the front cover exploded from the modesty panel according to one aspect.
FIG. 7B is an exploded view of a cable management system according to one aspect.

The track housing 170 can include a first track housing member 176 that forms a rear face of the track housing 170, and a second track housing member 178 that forms a front face of the housing 170. One or both of the first 176 and second 178 track housing members may include a sidewall 177 extending between the first 176 and second 178 housing members and defining a shape of the track housing 170. In the illustrated embodiment, the second track housing member 178 is adapted to removably couple to the first track housing member 176 via track sidewalls 177 extending from each of the first and second track housing members. As shown in FIGS. 6A and 7A, in one aspect, the first track housing member 176 can include track sidewall 177 including a plurality of detents 182 extending from a track surface 179. The second track housing member 178 may include a track sidewall 177 including a plurality of holes 184 extending from a track surface 179. The second track housing member 178 can couple to the first track housing member 176 through the detents 182 on the first track housing member and the holes 184 on the second track housing member 178. The coupling of the first track housing member 176 and the second housing member 178 is shown in FIGS. 6B and 7A. In an alternate aspect, the detents 182 may be located on the second track housing member 178 and the holes 184 may be located on the first track housing member 176. In another aspect, the first track housing member 176 and the second track housing member 178 may each include a plurality of detents 182 and holes 184 configured to align with the holes and detents on the other track housing member. In one aspect, the second track housing member 178 can be configured to couple to the first track housing member 176 through any suitable means.

The first track housing member 176 can be adapted to removably couple to the back cover 120 through the at least one mounting bracket 130. In one aspect, the second track housing member 178 may also removably couple to the back cover 120 while the first track housing member 176 is coupled to the back cover 120. In one aspect, the first track housing member 176 can be fixedly coupled to the back cover 120.

In one aspect, the cable management system 160 is non-handed. Put another way, the track housing 170 may be mounted to either the left or the right side of the back cover 120 and may be switched (the track housing 170 can be flipped and attached to either of the mounting brackets 130). To achieve this, first track housing member 176 and the second track housing member 178 can be mirror images of each other. As depicted, the first track housing member 176 is mounted to the back cover 120 using the right side mounting bracket 130 and the second track housing member 178 is coupled to the first track housing member 176 to enclose the track housing 170. The same components can be used to mount the track 170 to the left side of the back cover 120 using the left side mounting bracket 130. In this aspect, the second track housing member 178 may be mounted to the back cover 120 using the left side mounting bracket 130 and the first track housing member 176 can be coupled to the second track housing member 178 to enclose the track 170.

Figure 3B:
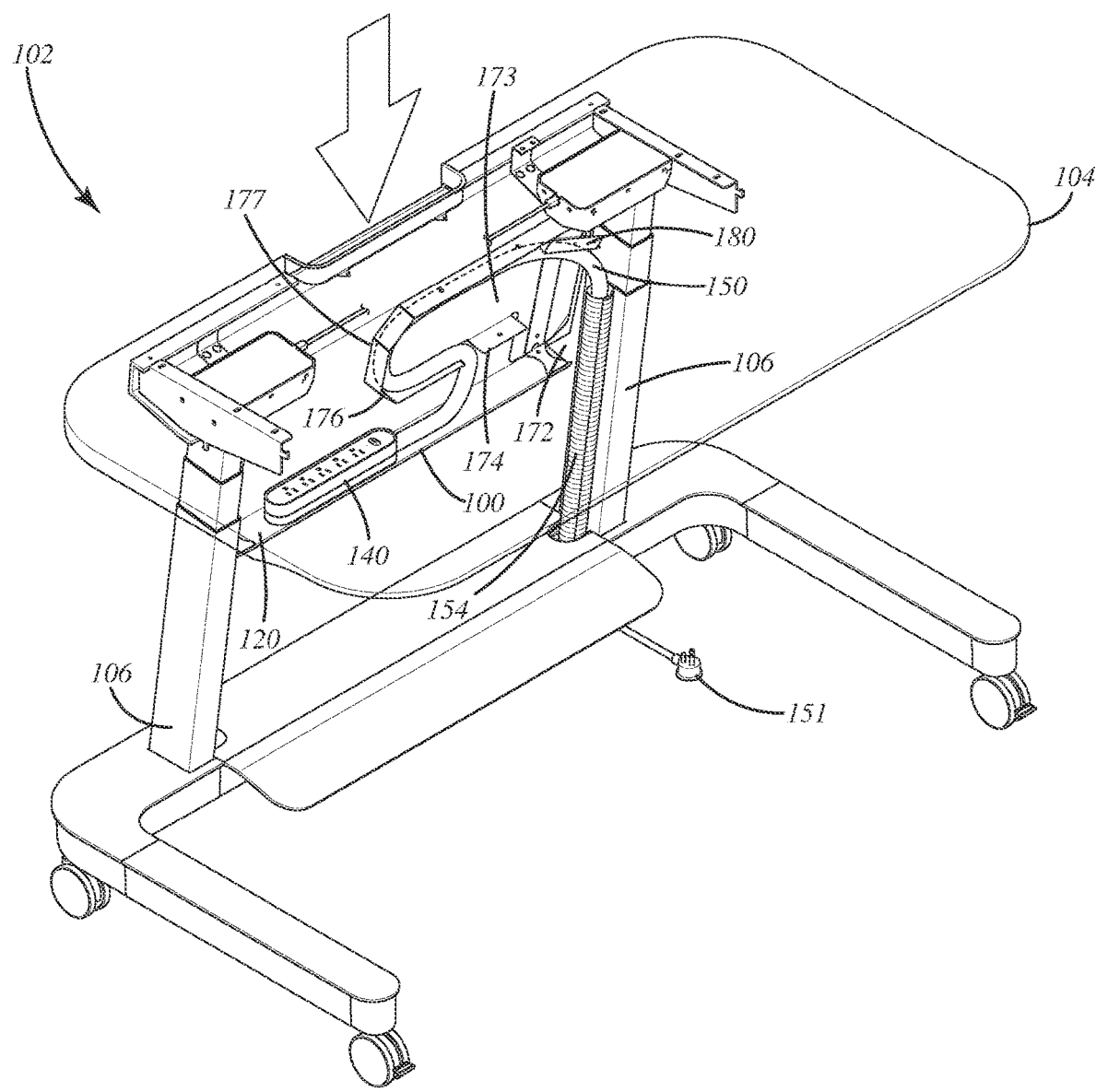
FIG. 3B is a modesty panel shown through a transparent worksurface and without a front cover showing the positioning of the cord system with the worksurface in a lowered position according to one aspect.

The internal cavity (or "cable storage compartment") of the track housing 170 according to one aspect can be seen in FIGS. 3A-3B and in FIGS. 6A and 7B. Put another way, FIGS. 3A-3B show the track housing 170 without the second track housing member 178. The interior of the track housing 170 may include at least one cable guide configured to engage and direct the cord system 150 into the rounded horizontal portion 173 of the track housing 170. In the illustrated embodiment, the cable guide is formed by an angled surface of the track sidewall 177, which is set at an angle with respect to the vertical sidewall 177 of the vertical portion 171 of the track housing 170, and at an angle to the horizontal sidewall 177 of the vertical portion 173. The angled surface may be formed by an angled bracket 180, which may be removably coupled to the track housing 170 across from the entrance opening 172. In one aspect, the angled bracket 180 may be removably coupled to the track housing 170 through one of the mounting brackets 130. In one aspect, the angled bracket 180 can be removably coupled to the track housing 170 through the back cover 120. In another aspect, the cable guide, and the angled surface provided by the cable guide, may be integral with the track housing 170.

FIG. 3A shows the HAT 102 at its highest position. As depicted, the cord system 150 is taut between the entrance opening 172 and the exit opening 174 and contacts a surface of the sidewall 177 of first track housing member 176. As the HAT 102 rises, a portion of the cord system 150 exits the track 170 through the entrance opening 172. The cord system 150 extends down a leg 106 of the HAT 102 and may be fixed to the leg 106 at one or more predetermined locations. FIG. 3B shows the HAT 102 at its lowest position. As the HAT 102 lowers, a portion of the cord system 150 enters the track 170 through the entrance opening 172. The cord system 150 contacts the angled bracket 180 and is redirected along the sidewall 177 of the track 170. As depicted, the cord system 150 is redirected along the rounded horizontal portion 173 to substantially take the shape of the sidewall 177 in the rounded horizontal portion 173. The track housing 170 guides the cord system 150 toward the exit opening 174 while giving the cord system 150 enough room to extend into the track housing 170 without the cord system 150 getting caught on itself. This reduces, and may eliminate, the risk of damage to the cord system 150 as the HAT 102 is raised and lowered. In one aspect, the cord system 150 enters the internal space of the track housing 170 and extends away from the entrance opening 172 until the cord system 150 contacts the sidewall 177 of the track housing 170 and follows the contour of the track housing 170. Put another way, at certain heights of the HAT 102, the cord system 150 may contact some or all of the sidewall 177 of the track housing 170. At certain heights, the cord system 150 may not contact the angled surface provide by the angled bracket 180, but as the worksurface is lowered, the cord system 150 eventually abuts the angled surface provided by bracket 180 and is directed along the track sidewall 177.

As the worksurface 104 is raised, the portion of the cord system 150 that entered the track housing 170 will be drawn out of the entrance opening 172 until the worksurface is in the fully raised position as shown in FIG. 3A. As depicted, the exit opening 174 is sized and positioned with respect to the power bar 140 and cord system 150 so that a fixed portion of the cord system 150 extends between the exit opening 174 of the track housing 170 and the power bar 140. In another aspect, the exit opening 174 can be sized so that more or less of the cord system 150 may exit the track housing through the exit opening 174 depending on the height of the HAT 102.

As illustrated, one end of the cord system 150 terminates at the power bar 140. An item resting on the worksurface 104, such as a laptop or phone, may route its power cable through a worksurface opening (not shown) to connect to and receive power from the power bar 140. An opposite end of the cord system 150 runs down the leg 106 and through a cord channel 154 and terminates at a conventional male plug end 151 (see FIG. 3B) that may connect to a power source such as a conventional wall outlet. In an alternate aspect, the cord system 150 may be configured to exit the modesty panel 100 in any other suitable manner.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Features of various embodiments may be used in combination with features from other embodiments. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the," or "said," is not to be construed as limiting the element to the singular.

The embodiments of the invention in which an exclusive property or privilege is claimed are defined as follows:

1. A cable management system for a height adjustable table, the height adjustable table having a worksurface capable of being raised and lowered, the worksurface having an underside, and the cable management system comprising:
   a back cover;
   a power bar having at least one electrical outlet;
   a cord system electrically connected between the power bar and an electrical power supply, the cord system including at least one cable; and
   a cable management track positioned adjacent the back cover and in a fixed positional relationship with respect to the power bar, the track having at least a track sidewall that defines a cable entrance portion including a cable entrance opening, a cable storage portion extending from the cable entrance portion and including a cable exit opening, and a cable guide;
   wherein the cord system extends into the track through the entrance opening and exits the track through the exit opening in the track, such that a length of the cord system is positioned within the cable management track, and wherein as the height adjustable table is moved to a lower position, the length of cord system within the track increases, with a portion of the cord system engaging the cable guide to route the cord system into the cable storage portion of the cable management track.

2. The cable management system of claim 1, wherein the back cover extends adjacent to the underside of the worksurface to form a modesty panel.

3. The cable management system of claim 2 including a front cover spaced from the back cover, wherein the track includes a front face adjacent the front cover and a back face adjacent the back cover, the track sidewall extending between the front face and the back face.

4. The cable management system of claim 3 wherein the track sidewall includes a front track wall and a back track wall, the front track wall integral with and extending from the front face and the rear track wall integral with and extending from the rear face, wherein one of the front track wall and the rear track wall includes a coupling protrusion and the other includes a detent aligned with the coupling protrusion such that the front and rear faces can couple via a snap fit between the coupling protrusion and the detent.

5. The cable management system of claim 4, wherein the front track wall and the rear track wall are mirror images.

6. The cable management system of claim 5 wherein the distance between the power bar and the cable exit opening is fixed.

7. The cable management system of claim 6 wherein the track sidewall within the cable entrance portion includes a pair of generally parallel sidewalls extending in a first direction, and wherein the track sidewall within the cable storage portion includes a pair of generally parallel sidewalls extending in a second direction different from the first direction such that the cable storage portion extends at an angle from the cable entrance portion.

8. The cable management system of claim 7 including at least one mounting bracket, the mounting bracket affixing the track to the underside of the worksurface.

9. The cable management system of claim 8 wherein the bracket is affixed to at least one of the front cover and the back cover.

10. A modesty panel for a height adjustable table capable of being raised and lowered, the modesty panel comprising:
    a back cover connected to the height adjustable table;
    a front cover coupled to and spaced from the back cover;
    a mounting bracket configured to removably couple at least one of the back cover and front cover to the height adjustable table;
    a power bar between the back cover and the front cover;
    a cord system electrically connected to the power bar and a power supply, the cord system including at least one cable and a sheath surrounding the at least one cable, the sheath providing rigidity to the cord system; and
    a cable track housing connected to the mounting bracket between the back cover and the front cover, the cable track housing including a front face, a back face, and a track sidewall extending between the front face and the back face, wherein the front face, back face and track sidewall combine to form a cable storage compartment, the track sidewall defining an entrance opening for the cord system, an exit opening for the cord system, and at least one cable guide surface;
    wherein the cord system extends through the entrance opening and the exit opening in the track housing, and wherein the amount of the cord system within the cable storage compartment increases as the height adjustable table is moved to a lowered position, wherein the cord system abuts the cable guide and is directed into the cable storage compartment and to take the approximate shape of the cable storage compartment.

11. The modesty panel of claim 10, wherein the cable track housing includes a cable entrance portion that includes the cable entrance opening, and wherein the cable track housing includes a cable storage portion extending from the cable entrance portion, the track sidewall of the cable entrance portion extending in a first direction, and the track sidewall in the cable storage portion extending in a second direction.

12. The modesty panel of claim 11, wherein the cable track housing defines a P-shape.

13. The modesty panel of claim 12 wherein the power bar is fixed in position with respect to the cable exit opening.

14. A cable management system for a height adjustable table, the height adjustable table having a worksurface capable of being raised and lowered, the worksurface having an underside, and the cable management system comprising:
    a back cover;
    a power bar having at least one electrical outlet;
    a cord system electrically connected to the power bar and an electrical power supply, the cord system including at least one cable; and
    a cable management track positioned adjacent the back cover and in a fixed positional relationship with respect to the power bar, the track having at least a track sidewall that defines a cable entrance portion including a cable entrance opening, a cable storage portion extending from the cable entrance portion and including a cable exit opening, and a cable guide;
    wherein the cord system extends through the entrance opening and the exit opening in the track, such that a length of the cord system is positioned within the cable management track, and wherein as the height adjustable table is moved to a lower position, the length of cord system within the track increases, with a portion of the cord system engaging the cable guide to route the cord system into the cable storage portion of the cable management track, wherein the cable guide is a portion of the track sidewall positioned opposite the entrance opening and is set at an angle with respect to the entrance opening to direct the cord system into the cable storage portion of the track.

15. The cable management system of claim 14 wherein the cable guide is an angled bracket that is coupled to the track.

16. A modesty panel for a height adjustable table having a worksurface capable of being raised and lowered, the modesty panel comprising:
    a back cover defining at least one cord system opening;
    a front cover configured to removably couple to the back cover;
    at least one mounting bracket configured to removably couple the back cover to the height adjustable table;
    a power bar coupled to at least one of the front cover and the back cover;
    a cord system electrically connected to the power bar and a power supply, the cord system including at least one cable and a sheath surrounding the at least one cable, the sheath providing rigidity to the cord system; and
    a cable track housing positioned between the back cover and the front cover, the cable track housing defining an entrance opening and an exit opening, the cable track housing including a first track housing member and a second track housing member adapted to removably couple to the first track housing member; and
    a cable guide positioned within the cable track housing across from the entrance opening, wherein the cord system extends through the entrance opening and the exit opening in the track housing, wherein a portion of the cord system enters the cable track housing through the entrance opening as the height adjustable table is lowered.

17. The modesty panel of claim 16, wherein the cable track housing includes a first portion and a second portion extending at an angle from the first portion, the first portion including the cable entrance opening, the cable guide extending at an angle with respect to the first and second portions.

18. The modesty panel of claim 17 wherein at least one of the first track housing member and the second track housing member includes a sidewall that defines a shape of the cable track housing, wherein in the first portion of the cable track housing the sidewall extends generally perpendicular to the worksurface, and wherein in the second portion of the cable track housing the sidewall extends generally perpendicular to the sidewall of the first portion.

19. The modesty panel of claim 18 wherein the first portion of the cable track housing forms a vertical section and the second portion of the housing forms a horizontal section extending from the vertical section.

20. The modesty panel of claim 18 wherein the second portion of the cable guide housing includes a first end abutting the first portion and a second end opposite the first portion, the second end having a rounded shape such that the cable guide housing forms a P-shape, wherein the cord system is routed to substantially match the shape of the second section when the height adjustable table is in a lowered position.

21. The modesty panel of claim 20, wherein at least one of the first track housing portion and the second track housing portion is configured to removably couple to the mounting bracket.

22. The modesty panel of claim 21, wherein at least one of the front cover and the back cover define a cable opening aligned with the cable entrance opening.

* * * * *